United States Patent [19]
Fincher

[11] 3,967,332
[45] July 6, 1976

[54] COMPOSITION BOARD UPHOLSTERY RAIL

[75] Inventor: Handley H. Fincher, Morganton, N.C.

[73] Assignee: Champion International Corporation, Stamford, Conn.

[22] Filed: Oct. 9, 1975

[21] Appl. No.: 621,215

Related U.S. Application Data

[63] Continuation of Ser. No. 456,963, April 1, 1974, abandoned.

[52] U.S. Cl. .................................. 5/286; 297/445
[51] Int. Cl.² ........................................ A47C 19/00
[58] Field of Search ........................... 52/724–728; 5/286; 297/440

[56] References Cited
UNITED STATES PATENTS

| | | | |
|---|---|---|---|
| 890,319 | 6/1908 | Wells | 182/220 |
| 2,155,804 | 4/1939 | Rubin | 52/728 |
| 3,467,434 | 9/1969 | Parker et al. | 297/445 |
| 3,527,498 | 9/1970 | Werner | 297/445 X |
| 3,591,213 | 7/1971 | Turner | 182/220 |

Primary Examiner—Paul R. Gilliam
Assistant Examiner—Andrew M. Calvert
Attorney, Agent, or Firm—Evelyn M. Sommer

[57] ABSTRACT

Furniture frame rails are formed from composition board, e.g., particleboard, fiberboard, or the like, and the ends have extruded aluminum bands press fitted thereon to prevent splitting of said ends when said rails are assembled to a frame with a doweled joint.

2 Claims, 4 Drawing Figures

U.S. Patent July 6, 1976 3,967,332
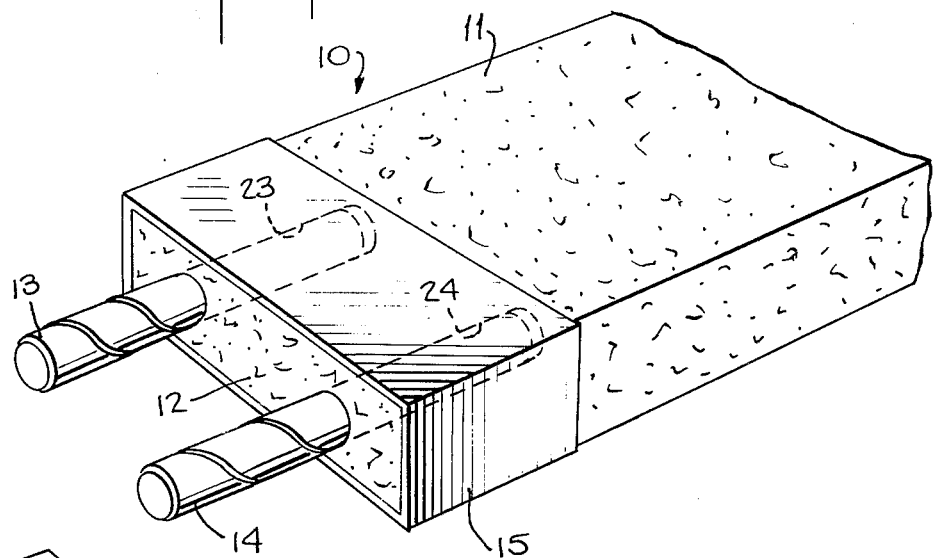
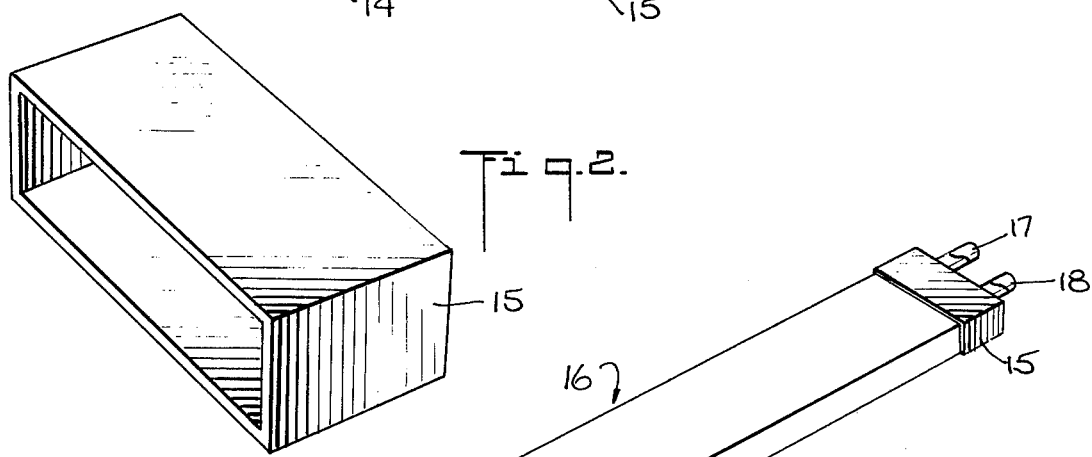
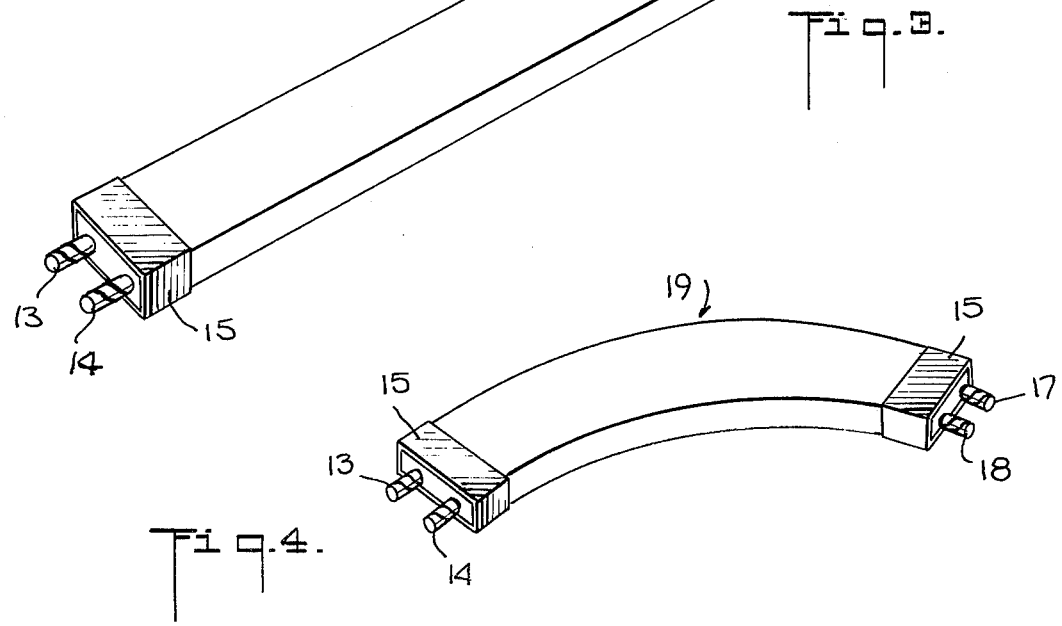

COMPOSITION BOARD UPHOLSTERY RAIL

This is a continuation of application Ser. No. 456,963, filed Apr. 1, 1974, now abandoned.

The present invention relates to furniture construction, and, more particularly, to the construction of rails for use in the frames of upholstered furniture.

Generally, the frames are made of wood and concealed in upholstered furniture. Although appearance is not a criterion, the need for structural strength, both in the body of the frame members and in the joints therebetween, has made it necessary for soild wood, and often hard wood, to be utilized. This adds to the cost of the finished article and considerable effort has been devoted to the discovery of substitutes.

Economically, and to a certain extent structurally, fiberboard and particle flakeboard have advantages over soild wood. However, considerable difficulty was encountered, heretofore, in producing rails from fiberboard or flakeboard or similar composition board which rails could be assembled into furniture frames with strong joints which would not splinter and fail under load. This is due to the fact that the ends of composition board rails have a great tendency to split giving rise to the rapid failure of doweled joints when the rail is made to support any weight. Glued butt joints because of their weakness do not afford a satisfactory alternative.

It is, therefore, an object of the present invention to overcome the aforesaid disadvantage and propensity to split. It is a further object of the invention to provide an inexpensive and sound rail of fiberboard or particle flakeboard or the like.

In accordance with one aspect of the present invention there is provided a rail for the frame of an upholstered article of furniture comprising a body of composition board having at least one end for joining said rail to said frame, at least one dowel secured within a bore in said one end of said body and projecting therefrom, and a band of reinforcing material having significant tensile strength and encircling said body adjacent said one end for preventing said composition board from splitting in the vicinity of said dowel in response to lateral force applied to said dowel.

The invention will be better understood after reading the following detailed description of the presently preferred embodiments thereof with reference to the appended drawings in which:

FIG. 1 is a fragmentary perspective view of one end of a composition board rail constructed in accordance with the subject invention;

FIG. 2 is a perspective view of the band of reinforcing material which is applied to the rail of FIG. 1;

FIG. 3 is a perspective view of a straight rail constructed in accordance with the subject invention; and FIG. 4 is a perspective view of a curved rail constructed in accordance with the invention.

The same reference numerals are used throughout the drawings to designate the same or similar parts.

Referring to FIGS. 1 and 2, the numeral 10 designates generally a rail for the frame of an upholstered article of furniture. The rail 10 consists of a body 11 of composition board having at least one end, for example, the end 12 in FIG. 1, for joining the rail 10 to a frame (not shown). At least one dowel, such as the dowel 13, is secured within a bore 23 in said one end 12 of the body 11 and projects therefrom in known manner. As illustrated in FIG. 1, the end 12 of the body 11 is provided with a second dowel 14 in a bore 24 for effecting a double-doweled joint. A band 15 of reinforcing material, e.g., a section of extruded aluminum, having significant tensile strength is press fitted over the end 12 of the body 11 adjacent said end. The band 15 encircling said body adjacent end 12 will prevent the composition board from splitting in the vicinity of the dowels 13 and 14 in the face of any lateral force applied to said dowels when assembled in a frame. As clearly shown in the drawings, the reinforcing band or collar 15 has a rectangular configuration to conform to the rectangular shape of the rail body.

While only one end of the rail is shown in FIG. 1, it will be understood that the opposite end of the rail, such as seen in FIGS. 3 and 4, may be similarly reinforced and provided with dowels for effecting a joint with adjacent members in a furniture frame. Thus, as seen in FIG. 3, the far end of the straight rail 16 is provided with a pair of dowels 17 and 18. Likewise, as shown in FIG. 4, the curved rail 19 is provided with a double set of dowels as shown.

The two rails shown in FIGS. 3 and 4 should be understood as only representative of the various configurations that a rail may take. Furthermore, the dowels 13, 14 and/or 17, 18 may be omitted such that female versions of the rail joints are produced. In such case the rail end would be pre-molded or predrilled to form bores such as 23 and 24 in FIG. 1 and the band 15 would be assembled. However, dowels would not be introduced into the bores until the frame is assembled.

Various other changes in construction may occur to those skilled in the art. Therefore, it is to be understood that all such changes are contemplated herein as fall within the confines of the true spirit of the invention defined in the appended claims.

What is claimed is:

1. A rail for the frame of an upholstered article of furniture adapted to receive upholstery material, said rail comprising a body of composition board consisting essentially of fiberboard or essentially of particle flakeboard having at least one end for joining said rail to said frame, at least one dowel secured within a bore in said one end of said body and projecting therefrom, and a seamless unitary band of reinforcing material in the form of a sleeve having significant tensile strength and encircling said body with a press fit adjacent said one end for preventing said composition board from splitting in the vicinity of said dowel in response to lateral force applied to said dowel.

2. A rail for the frame of an upholstered article of furniture adapted to receive upholstery material, said rail comprising a body of composition board consisting essentially of fiberboard or essentially of particle flakeboard having at least one end for joining said rail to said frame, at least one bore in said one end for receiving a dowel to form a joint, and a seamless unitary band of reinforcing material in the form of a sleeve having significant tensile strength and encircling said body with a press fit adjacent said one end for preventing said composition board from splitting in the vicinity of said bore due to the stresses engendered by a dowel when secured therein.

* * * * *